United States Patent [19]

Zhukov et al.

[11] Patent Number: 4,468,771
[45] Date of Patent: Aug. 28, 1984

[54] LIGHT-GUIDE UNIT FOR TRANSMITTING THERMAL RADIATION FROM MOLTEN METAL TO PYROMETER

[75] Inventors: Leonid F. Zhukov; Evgeny G. Chugunny; Vladimir S. Shumikhin, all of Kiev, U.S.S.R.

[73] Assignee: Institut Problem Litya Akademii Nauk Ukrainskoi SSR, U.S.S.R.

[21] Appl. No.: 373,490

[22] PCT Filed: Aug. 22, 1980

[86] PCT No.: PCT/SU80/00143

§ 371 Date: Apr. 19, 1982

§ 102(e) Date: Apr. 19, 1982

[87] PCT Pub. No.: WO82/00712

PCT Pub. Date: Mar. 4, 1982

[51] Int. Cl.³ .......................... G01K 1/12; G01K 5/08
[52] U.S. Cl. ................................ 374/131; 350/96.24; 356/44; 374/139
[58] Field of Search ............... 374/131, 121, 125, 130, 374/139, 132; 356/44; 350/96.24

[56] References Cited

U.S. PATENT DOCUMENTS

| | | | |
|---|---|---|---|
| 3,051,035 | 8/1962 | Root | 374/131 X |
| 3,077,539 | 2/1963 | Blau, Jr. et al. | 374/2 |
| 3,570,277 | 3/1971 | Dorr et al. | 374/131 |
| 3,745,834 | 7/1973 | Veltze et al. | 374/131 |
| 3,862,574 | 1/1975 | Antoine et al. | 374/121 |

FOREIGN PATENT DOCUMENTS

| | | |
|---|---|---|
| 2929693 | 5/1981 | Fed. Rep. of Germany . |
| WO82/00712 | 4/1982 | PCT Int'l Appl. . |
| 1210993 | 11/1970 | United Kingdom . |
| 1394754 | 5/1971 | United Kingdom . |
| 1522610 | 8/1978 | United Kingdom . |

Primary Examiner—Daniel M. Yasich
Attorney, Agent, or Firm—Lilling & Greenspan

[57] ABSTRACT

A light-guide unit comprises a light-forming rod and a light-transmitting rod, both rods being made from a light-permeable corrosion-resistant refractory material, for instance synthetic corundum, and coaxially arranged relative each other. According to the invention the length of the light-forming rod is equal to the thickness of the metallized layer of a lining, and the length of the light-transmitting rod is not less than the thickness of the remaining portion of the lining. The rods are connected by a protection sleeve made from a material featuring plasticity at the operating temperature of the lining, and disposed in the tube. The tube at the portion wherein the light-forming rod is disposed is filled with a first refractory material having a sintering temperature not higher than the sintering temperature of the lining, and whose resistance to the action of the products of melting is similar to that of the lining. At the operating temperature of the lining the first refractory material has a linear expansion coefficient which is substantially as that of the rods, and which forms a viscous mass which does not fuse with the rod. In particular, silicon oxide powder is used as the first refractory material. The portion of the tube wherein the rod is located is filled with the second refractory material having a sintering temperature higher than the sintering temperature and the operating temperature of the lining, which refractory material is, in particular, corundum powder.

8 Claims, 16 Drawing Figures

LIGHT-GUIDE UNIT FOR TRANSMITTING THERMAL RADIATION FROM MOLTEN METAL TO PYROMETER

FIELD OF THE INVENTION

This invention relates to measurement technology and, in particular, to optical pyrometry, and is specifically concerned with a light guide unit mounted in the lining of a metallurgical vessel and designed for transmitting thermal radiation from a melt to a pyrometer.

BACKGROUND OF THE INVENTION

Along with indisputable advantages the optical pyrometry has over the other measuring meathods, and in particular, over the measuring method based on the use of thermocouple elements immersed in a melt (which enables continuously controlling the temperature, contactlessly effecting the measuring process etc.) it has a number of disadvantages which manifest itself under operating conditions. Thus, the measurement accuracy of pyrometers depends to a great extent on the optical properties of a radiating surface and intermediate medium.

One of the promising trends in optical pyrometry used in measuring the temperature of molten metals is the development of methods which are based on the use of light guides which form an insulated channel for transmitting thermal radiation from a melt to a pyrometer, thereby making it possible to reduce the influence of the above factors on the measurement accuracy. To enhance the efficiency of such light guides they are incorporated in light guide units which are mounted in the lining of a metallurgical vessel so that one end of the light guide is exposed to the melt and the other one is brought out to a pyrometer.

However, providing a light-guide unit, having a high operational reliability and satisfactory optical features which would ensure an improved measurement accuracy and wherein the light guides could be used repeatedly, is a problem the specialists in this field encounter in their attempts to develop such a light-guide unit.

DESCRIPTION OF THE PRIOR ART

There is a great number of patents which have been recently granted in various countries (cf. USSR Authors' Certificates Nos. 146,533 and 271,067; Austria Pat. No. 280,650; Federal Republic of Germany Pat. No. 2,338,532) and which confirm that this problem is an urgent one. Although a great many attempts have been made, the above problem has not been satisfactorily solved yet.

There is known a light-guide unit comprising a light-transmitting rod made of light-permeable corrosion-resistant refractory material, preferably of quartz glass, housed within a thin steel pipe mounted inside another pipe made from refractory material (cf. for example, British Pat. No. 1,210,993). An annular gap formed between said pipes is filled with a refractory powder, in particular zirconium oxide. One end of the light guide is exposed to a molten metal, and the other one which extends outside the vessel is connected with a light-absorbing pyrometer by means of a flange.

The use of the above light-guide unit for measuring the temperature of molten metal is associated with a number of difficulties. First, the light-transmitting rod of the above light-guide unit cannot be used repeatedly since this light-transmitting rod fails when the operation of the metallurgical vessel is stopped and the lining thereof fully cooled, for example, in the case of replacing the lining after its service life has run out. Since the service life of the lining in many metallurgical vessels is not longer than several days, the frequent replacement of the light-transmitting rod makes the measuring process with the use of the above light-guide unit costly, especially when they incorporate high-priced materials such as synthetic corundum. In the metallurgical vessels having a lining with a longer service life (several months), and wherein the cost of the measuring process is lower as a result, nevertheless the problem of repeatedly using light-transmitting rods remains an urgent one.

It is to be noted that because in the prior art light-guide unit the annular gap between the tubes is filled with the zirconium oxide powder having a relatively high sintering temperature, said powder is not sintered when the lining is sintered or during the melting process. The sintering of this powder enhances the reliability of the light-guide unit operation as it prevents the powder from being washed out by the melt, and thereby rules out the possibility of the melt breaking through the lining outside the metallurgical vessel, thus preventing a serious hazard that such breakage may be for the attending personnel.

For above reason it is necessary to preliminarily sinter zirconium oxide powder, which however, complicates to a great extent the manufacture of the light guide unit. In addition, this powder even when sintered features a relatively low heat reasistance which results in that it breaks off as a result of thermal shocks (sharp change of the lining temperature) and is washed out by the melt. This causes the deterioration of the exposed end of the light-guide rod, which leads on the one hand to the change of the radiation ability thereof, and hence to a lower measurement accuracy, and on the other hand to the breakage of the melt through the lining if the exposed end is damaged too much.

The above disadvantages have been considered proceeding from the assumption that said zirconium oxide powder was sintered preliminarily if only partially. However, the sintering temperature of said powder is such that in practice the steel tube protecting the light-transmitting rode will start melt down sooner than this powder starts to sinter. Therefore the above light-guide unit can be used only with unsintered powder, which brings down the operational realiability of said light-guide unit.

It should be also noted that because in the above light guide unit the light-transmitting rod is rigidly connected to the shell of the metallurgical vessel it tends to fail at the shell-lining interface as a result of displacement of the lining relative the shell of the vessel in the course of operation thereof. In addition, the light-transmitting rod is frequently damaged in its middle portion as a result of displacement of the lining layers relative each other, which takes place when the temperature of the lining changes, as well as during charging the vessel and running off the melt. On the other hand, if the strength of the material of the light-transmitting rod is stronger than that of the lining, the lining may be damaged as a result of the above-mentioned displacement, which may result in lining break and metal run-out.

Because of the above disadvantages said light-guide unit has not found a wide application in practice.

There is also known a light-guide unit for transmitting a thermal radiation from the melt to a pyrometer, which unit comprises two coaxially arranged light-permeable rods; a light-forming rod and a light-transmitting rod (cf. "Ustroistvo dlya izmereniya tempuratury zhydkogo metalla", USSR Author's Certificate No. 393,961, Int. Cl. G OI J 5/02, published June 25, 1977).

In the above light-guide unit the light-forming rod (in the above specification is refered to as an "immersed portion") is made from sapphire, and the light-transmitting rod (refered to as a light-guide portion) is made from quartz glass. Both the rods are positioned within a metal tube filled with a refractory powder. The tube has a length equal to the thickness of the lining and is mounted in the lining through a hole provided in the shell of a metallurgical vessel. The length of the light-forming rod is selected so as to provide operation of the light-guide unit for 20-25 melts, whereafter the remainder thereof is driven inside the vessel, and a new rod is mounted.

Such construction of the light-guide unit incorporating two light-permeable rods was expected to stabilize optical properties of the unit as a whole, since one-piece quartz rod optical properties vary in the zone of high temperature. However, it was not taken into account that sapphire used as a material of the light-forming rod and having a high light permeability might cause the light-transmitting rod end which is made from quartz to be heated up to a temperature at which the material of said end of the light-transmitting rod begin to crystallize, which changes the optical properties of this end as a result. This especially manifests itself during last melts when the length of the rod is much shorter than the initial one.

In addition, the metal tube accommodating the light-permeable rods is gradually ruined by the melt, so that on the inner surface of the lining, adjoining the exposed end of the light-forming rod, there is formed a flaw causing fracture of the exposed end. Attempts to eliminate this disadvantage by making said tube stronger than the lining of the metallurgical vessel leads to not the tube but the lining being damaged, which may result in lining break and metal run-out.

Further, because the light-forming rod in the above light-guide unit is designed for 25 melts as maximum, this rod has to be frequently replaced during the service life of the lining, which increases the amount of auxiliary jobs required. For instance, in the induction furnaces said rod is replaced 15-20 times during the service life of one and the same lining.

It is also to be noted that the ends of the light-permeable rods in the prior art light-guide unit are not protected at their junction from ingress of the refractory powder particles and products of melting, as a result of which said ends become hazy, thereby affecting the measurement accuracy.

The construction of the above light-guide unit does not fully eliminate a failure of the light-forming rod as a result of the temperature gradient change across the thickness of the lining, and a failure of the light-transmitting rod as a result of displacement of the lining.

SUMMARY OF THE INVENTION

The invention consists in the provision of a light-guide unit for transmitting a thermal radiation from a melt to a pyrometer, wherein due to a flexible coupling between the elements of the light-guide unit the probability of deterioration thereof in the course of its operation is decreased, and there is provided a possibility of repeatedly using its light-transmitting rod.

The object of the invention is attained by a light-guide unit for transmitting a thermal radiation from a melt to a pyrometer, comprising a light-forming rod and a light-transmitting rod, said rods being made from a light-permeable corrosion-resisting refractory material and coaxially arranged within a tube filled with a refractory material and mounted in the lining of a metallurgical vessel. According to the invention the light-forming rod has a length equal to the thickness of a metallized layer of the lining, whereas the light-transmitting rod has a length which is not less than the thickness of the remainder portion of the lining and is connected with the light-forming rod by means of a protection sleeve made from a material featuring plasticity at the operating temperature of the lining. The tube is filled at the location of the light-forming rod with a refractory material having a sintering temperature not higher than that of the lining and a linear expansion coefficient being at the operating temperature of the lining substantially equal to the linear expansion coefficient of said rods, the same resistance to the effect caused by the products of melting, and forming at the operating temperature of the lining a viscous mass which does not fuse together with the light-forming rod material. At the location of the light-transmitting rod this tube is filled with a refractory material having a sintering temperature higher than the operating temperature of the lining and the sintering temperature thereof.

Throughout this specification the term "metallized layer" should be understood as the lining layer exposed to the melt and whose pores are filled with metal.

The above construction of the light-guide unit provides for a flexible coupling between its elements, which flexible coupling is obtained by the length of the light-forming rod determining the location of its joint with the light-transmitting rod being selected not depending on the required length of the service life of the light-forming rod, as in the case of the prior art light-guide unit, but depending on the thickness of the metallized layer of the lining. This is explained by the fact that, as the tests have shown, the most of load acting, as a result of lining displacement upon a light-transmitting rod made as a one-piece construction, occurs at the interface between the metallized and non-metallized layers of the lining. Therefore, if the joint between the light-forming rod and the light-transmitting rod is located at said interface, these rods can displace relative each other without being deteriorated.

The presence of the protection sleeve connecting these two rods rules out ingress of the products of melting and the particles of the refractory material on the abutting ends of the rods. The material of the sleeve, which features plasticity at the operating temperature of the lining, ensures that the rods can displace relative each other without deterioration of the tightness of their joint.

Filling said tube at its different portions with different refractory powders imparts to the light-guide unit a required flexibility and ensures its high operational reliability.

The first portion of the tube, the length of which portion is determined by the length of the light-forming rod, is filled with a refractory material having a sintering temperature not higher than the sintering temperature of the lining, due to which the said material is sintered either prior to or simultaneously with the lining of the metallurgical vessel, thereby providing an integrity and solidity of the lining at the location of the exposed end of the said rod. Having the same resistance to the enfluence of the products of melting as the lining causes this refractory material to wear at the same rate as the lining does, which rules out the formation of flaws on the inner surface of the lining around the exposed end of the rod, and thus the lining break and the melt run-out. Due to the fact that said refractory material forms at the operating temperature of the lining a viscous mass which does not fuse together with the material of the light-forming rod, the mechanical loads arising as a result of the temperature gradient change with the depth of the lining and the displacement of the layers thereof will be lower than these arising in the prior art unit under the same conditions. The equality of the linear expansion coefficients of said refractory material and of the refractory material of the light-forming rod provides for a simultaneous change of their linear sizes during heating, which also decreases mechanical loads acting on the light-forming rod. This is especially important for that zone of the lining where the change of temperature gradient occurs.

The second portion of the tube, the length of which is determined by the position of the light-transmitting rod, is filled with a refractory material which has a sintering temperature exceeding the operating temperature of the lining and the sintering temperature thereof and remains therefore during operation of the metallurgical vessel in a non-sintered state, due to which the light-transmitting rod can be displaced by the displacement of the lining and turned relative the light-forming rod without being deteriorated. At the same time the light-transmitting rod can move relative the refractory material and therefore may be freely removed from the guide-light unit when the lining is replaced, and thereby provides for repeated use of the light-transmitting rod.

The proposed light-guide unit may be variously constructed. For instance, alternative modifications of the proposed light-guide unit may differ from each other by the type of the refractory material used at the section of the location of the light-transmitting rod.

The most simple embodiment of the proposed device is where the tube is filled at the location of the light-transmitting rod with a powder refractory material such as a zirconium oxide powder.

It is expedient that the proposed light-guide unit be constructed so that the tube at the place at which the light-transmitting rod extends therefrom be filled with a fibrous refractory material and at the remainder section with a powder refractory material. The presence of the fibrous refractory material, such as, for instance, kaolin wool improves the flexibility of the light-guide unit, in particular of its portion located at the interface of the "lining-metallurgical vessel shell", and thereby provides for a better tightness of the light-guide unit as a whole.

It is useful to fill the tube with a fibrous refractory material at the whole length of the location of the light-transmitting rod, which will make the proposed light-guide unit even more flexible.

It is also expedient that the proposed light-guide unit be embodied so that the protection sleeve connecting the light-forming rod and the light-transmitting rod be made of a material having a linear expansion coefficient lower than those of the said rods. Such construction provides for, with the increase of the temperature, the tightness of adjoining of the protection sleeve to the lateral surfaces of said rods at their common joint, and thereby ensures a more reliable protection against ingress of the products of melting onto the abutting ends of said rods, thus providing for a high and stable measurement accuracy.

It is also desirable that the proposed light-guide unit be embodied so that the protection sleeve connecting said rods have at the joint between said rods a corrugated portion, which will improve its flexibility, and hence the flexibility of the light-guide unit as a whole.

It is advantageous that at the place of conjunction said rods have flat ends and be spaced from each other to a distance determined by the following condition:

$$\delta < d \cdot tg\beta + \alpha \cdot \Delta T \cdot (L/2),$$

where $\delta$ = is a gap between said rods, in mm;
  $d$ = is a diameter of said rods in mm;
  $\beta$ = is a maximum angle between said rods in the case of the lining displacement, in degrees;
  $\alpha$ = is linear expansion coefficient of the rods, $K^{-1}$;
  $\Delta T$ = is a difference between the mean operating temperature of the protection sleeve and the initial temperature thereof, K;
  $L$ = is a length of the protection sleeve, in mm.

Such construction of the proposed apparatus rules out fracturing of the rod end edges of the abutting rods in the case of their relative angular displacement and the thermal expansion thereof.

To eliminate the influence of the angle magnitude of the abutting ends of said rods on the measurement results it is advisable to form one of the abutting ends spherically convex and the other one spherically concave with the same radius of a sphere and to install said rods with a gap therebetween which is determined by the condition:

$$\delta > \alpha \cdot \Delta T \cdot (L/2)$$

Such construction of the proposed light-guide unit not only rules out the fracture of edges of said rods but also provides for the angle, at which the thermal rays coming from the light-forming rod impinge upon the abutting end of the light-transmitting rod, is maintained constant, since in this case said rays are always directed radially with respect to a spherical surface irrespective of the value of the angle between said rods. The thermal radiation loss in this case at the location of the joint between the rods will be practically constant irrespective of the amount of displacement of the lining and the rods, which ensures that the radiation flux towards the pyrometer is maintained stable. This provides for a high degree of the measurement accuracy in measuring the temperature, carried out with the aid of the proposed light-guide unit.

In case the light-forming rod and the light-transmitting rod are made from a crystalline material featuring a double refraction it is expedient to position the rods relative each other so that the main optical planes coincide to form a common plane, and the optical axis of these rods together with their common geometrical axis form in said plane a triangle whose base is a corresponding segment on said geometrical axis, and the base angles are the angles of orientation of the crystal in said rods, the light-transmitting rod having a length which is determined from the equation $$l_2 = l_1 \cdot \frac{n_o - n_{e1}}{n_o - n_{e2}},$$

where $l_1$ is a length of the light-forming rod, equal to the depth of the metallized layer of the lining, in mm;

$l_2$ is a length of the light-transmitting rod, in mm;

$n_o$ is a refractive index of the ordinary ray in the light-forming rod and the light-transmitting rod;

$n_{e1}$, $n_{e2}$ is a refractive index of the extraordinary ray in said rods.

Hereinafter the crystal orientation angle in a corresponding rod is an angle between the optical axis and the geometrical axis of said corresponding rod not exceeding 90°.

As regards the last modification of the proposed light-guide unit it is worth explaining the following. It is known that in crystals having a double refraction, for example in the crystals of the synthetic corundum, the ordinary and extraordinary rays are refracted in different ways, which results in the splitting-off of the image of the light-forming rod, analyzed by the pyrometer. The radiation characteristics of said exposed end are different in different places of this image. This difference increases with the increase of the angle between the light-forming rod and the light-transmitting rod, which affects the measurement accuracy of the unit. If the ratio of the length "$l_2$" of the light transmitting rod to the length "$l_1$" of the light-forming rod is equal to $$\frac{n_o - n_{e1}}{n_o - n_{e2}}$$

and their relative orientation is such as proposed above, the influence of the double refraction effect on the measurement results is entirely eliminated.

BRIEF DESCRIPTION OF THE DRAWINGS

The nature of the invention will be clear from the following description of embodiments thereof which are represented in the accompanying drawings, wherein:

FIGS. 7 to 16 illustrate the steps of mutually orienting the rods in the proposed device in the case of FIG. 6, wherein:

FIG. 7 is an axonometric representation of the initial position of the rods, when their main optical planes are disposed at an angle relative each other;

FIG. 8 shows the direction of the thermal radiation rays through the rods in the case of FIG. 7;

FIG. 9 shows the exposed end of the light-forming rod received by the lens of the pyrometer in FIG. 7;

FIG. 10 is an axonometric representation of the rods in the embodiment wherein their main optical planes form a common plane;

FIG. 11 shows the path of the rays through the rods for the case in FIG. 10;

FIG. 12 shows the exposed end of the light-forming rod, received by the lens of the pyrometer in FIG. 10;

FIG. 13 shows the path of the rays through the rods for the case when the optical axis thereof form together with their common geometrical axis a triangle, and wherein the length of the light-transmitting rod does not correspond to the recommended one;

FIG. 14 shows the exposed end of the light-forming rod received by the lens of the pyrometer in FIG. 13;

FIG. 15 shows the path of the radiation rays through the rods in the modification wherein the length of the light-transmitting rod is selected in accordance with the recommended condition;

FIG. 16 shows the exposed end of the light-forming rod received by the lens of pyrometer in FIG. 15.

DETAILED DESCRIPTION OF THE INVENTION

Figure 1:
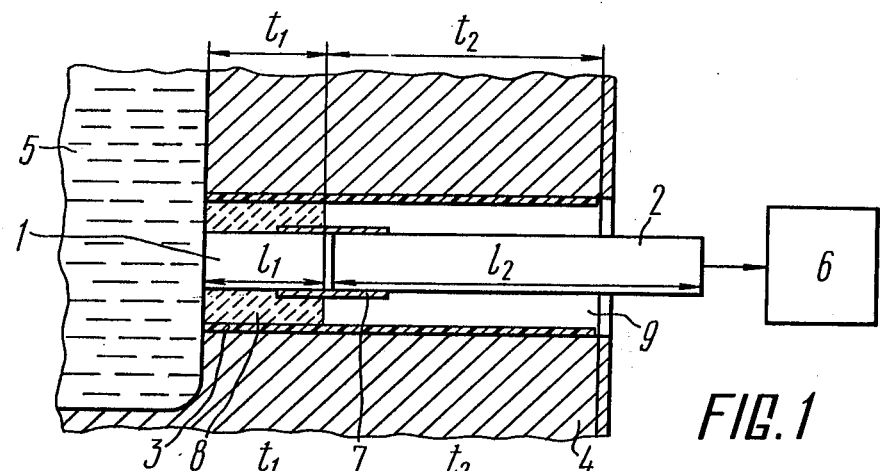
FIG. 1 is a longitudinal section of the proposed light-guide unit for transmitting thermal radiation from a melt to a pyrometer, mounted in the lining of a metallurgical vessel.

Referring now to FIG. 1 of the accompanying drawings, a light-guide unit of the invention comprises a light-forming rod and a light-transmitting rod arranged coaxially relative each other within a ceramic tube 3. The rods 1 and 2 are made from a light-permeable refractory corrosion-resistant material, in particular, from a synthetic corundum, for instance, sapphire. It is also possibly to use for this purpose a quartz glass or monocrystals of hafnium oxide, yttrium oxide, zirconium oxide, or oxides of other rare metals.

When in use the tube 3 accommodating the rods 1 and 2 is located in the lining 4 of a metallurgical vessel containing a melt 5. The operating end i.e. exposed end of the light-forming rod is exposed to the melt 5, and at the outer end of the light-transmitting rod there is mounted a pyrometer 6.

According to the invention the light-forming rod 1 has a length $l_1$ equal to the depth $t_1$ of the metallized layer of the lining 4, and the light-transmitting rod 2 has a length $l_2$ which is not less than the depth $t_2$ of the remainder portion of the lining 4. With such length of the rods 1 and 2 mechanical loads caused by the displacement of the lining 4 layers and acting upon the light-guide unit are not considerable, which improves the flexibility of the light-guide unit as a whole and, hence, its operational reliability.

The rods 1 and 2 are connected with each other through a protection sleeve 7, protecting the abutting ends of these rods from the influence of the products of melting, and thereby ruling out the deterioration of the transparency of said rod ends during operation. The sleeve 7 is made from a material featuring a ductility at a temperature equal to the operating temperature of the lining 4, and whose linear expansion coefficient is less than that of the rods 1 and 2. It is to be noted that, if the maximum temperature at the point between these rods does not exceed 1300° C., it is expedient to manufacture the sleeve 7 from tantalum. If this temperature is higher than said temperature, it is more convenient to use the sleeve 7 made from quartz. To provide a more reliable tightness of the joint it is useful to secure said sleeve to the rods 1 and 2 by means of paste.

An annular gap between the rods 1 and 2 and the tube 3 wall is filled with various refractory materials: the portion of the gap at the location of the light-forming rod whose length is determined by the length "$l_1$" is filled with a refractory material 8 having a sintering temperature not higher than the sintering temperature of the lining, and whose linear expansion coefficient coincides at the operating temperature of the lining with the linear expansion coefficient of the rods 1 and 2. The refractory material 8 has the same resistance to the influence of the products of melting as the lining 4 has. At a temperature equal to the operating temperature of the lining 4, the material 8 becomes a viscous mass which does not fuse with the light-forming rod 1.

In case the rods 1 and 2 are made from synthetic corundum, in the case of an acid lining 4, the refractory material 8 is a sulica flour ($SiO_2$), in the case of the basic lining from forsterite ($2MgO.SiO_2$), and in the case of a neutral lining from corundum powder ($Al_2O_3$). Said refractory materials sinter either sooner than or simultaneously with the lining 4, thereby providing for a solidity at the location of the light-guide unit, in particular, at the location of the light-forming rod 1. Such construction providing uniformity of the wearing rate of the lining 4.

At the location of the light-transmitting rod 2 the tube 3 is filled with a refractory material 9 whose sintering temperature is higher than either the operating temperature of the lining 4 or the sintering temperature thereof. This is explained by that the sintering temperature of the lining 4 may be either higher or lower than its operating temperature, but in either case the refractory material 9 must be in a green state for the whole period when the temperature of the lining is being raised. In this case displacement of the light-transmitting rod relative the light-forming rod 1 and the tube 3, which may be caused by the displacement of the lining 4, will not damage the light-guide unit. Furthermore, such construction permits the light-transmitting rod to be readily removed from the tube 3, in the case of replacing the lining, and repeatedly used.

The refractory material can be used in a powder form. For instance, corundum powder may be used as a refractory material in the case of the acid lining, and magnesium oxide is suitable in the case of the basic and neutral linings.

Figure 2:
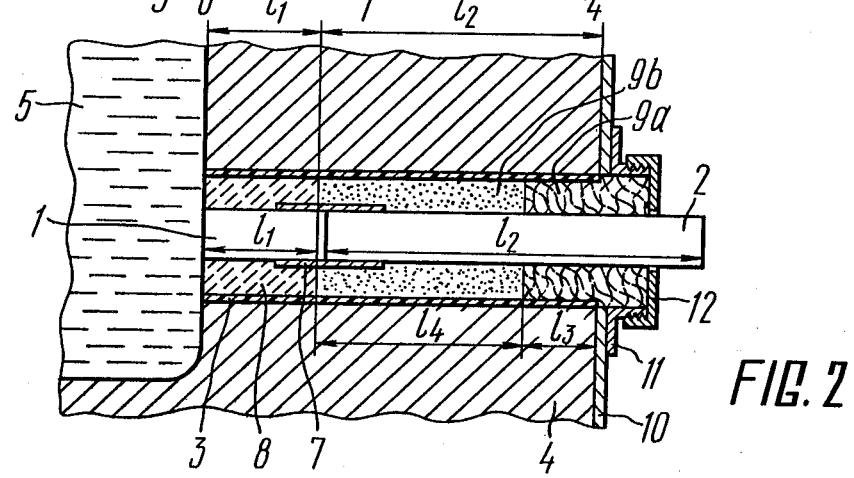
FIG. 2 is an alternative modification of the proposed light-guide unit in FIG. 1, wherein the tube at the location of the light-transmitting rod is filled with a powder and fibrous refractory materials.

The tube 3 at the place where the light-transmitting rod 2 (zone "$l_3$" in FIG. 2) extends therefrom may be filled with a fibrous material 9a, for instance, caolin wool, and the rest of the portion of the tube 3 wherein the rod 2 is disposed (zone 14) may be filled with a powder material 9b having one of the above-mentioned composition. Such composite filling of the tube 3 is preferable, because it improves flexibility and tightness of the light-guide unit as a whole. In the best modification the tube 3 is filled with a fibrous material not only in the zone $l_3$, but in the zone $l_4$ as well, that is along the whole length of the rod 2. A proper compaction of the fibrous material 9a is obtained by means of a threaded sleeve 11 fixed on the shell 10 of the metallurgical vessel and fitted with a cap screwed thereon.

The proposed light-guide unit operates as follows. When the rod 1 working end (FIG. 1) is exposed to the melt 5 it begins to radiate, with the radiation produced by said exposed rod end being in the form of a ray transmitted through the light transmitting rod to the pyrometer 6 whose readings are used for determining the temperature of the melt 5. Due to a structural flexibility of the light guide unit the thermal radiation transmitted thereby remains stable irrespective of displacements of the lining 4.

Figure 3:
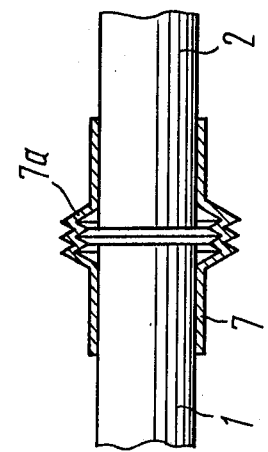
FIG. 3 illustrates a partial view of the proposed light-guide unit according to a modification wherein the protection sleeve has a corrugated portion at the location of the joint between the light-forming rod and the light-transmitting rod.

To further improve the flexibility of the proposed light-guide unit the sleeve 7 at the joint between the light-forming rod 1 and the light-transmitting rod 2 has a corrugated portion 7a (FIG. 3).

Figure 5:
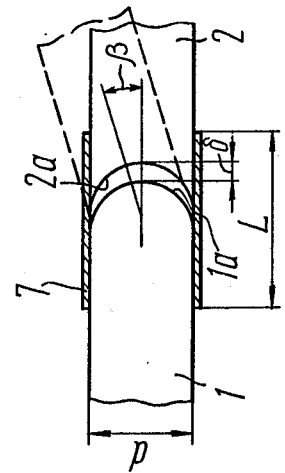
FIG. 5 illustrates a portion of a light-guide unit, wherein the ends of the light-forming and of the light-transmitting rods are made spherical.
Figure 4:
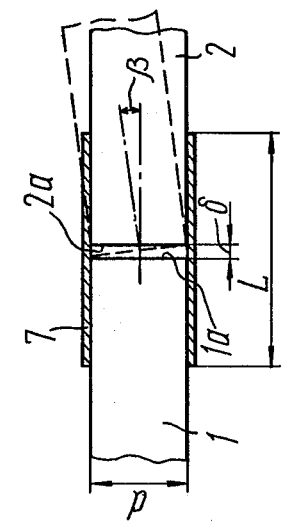
FIG. 4 schematically represents a portion of an alternative light-guide unit wherein abutting ends of the light-forming rod and of the light-transmitting rod are flat (shown in dotted line is a maximum displacement of the light-transmitting rod)

Shown in FIGS. 4 and 5 are possible shapes of the abutting ends of the rods 1 and 2.

FIG. 4 illustrates one alternative modification wherein the rods 1 and 2 have flat ends 1a and 2a respectively, and the gap therebetween is selected by the condition $$\delta > d \cdot tg\beta + \alpha \cdot \Delta T(L/2),$$

where d is a diameter of the rods 1 and 2, in mm;

$\beta$ is a maximum angle between said rods in the case of displacement of the lining, in degrees, $\alpha$ is a linear expansion coefficient, $K^{-1}$;

L is a length of the sleeve 7, in mm;

$\Delta T$ is a difference between the mean operating temperature of the sleeve 7 and the initial temperature thereof, i.e. before operation, K.

Given below in a tabulated form are the calculation results of determining a minimum gap with different values of said mathemetical relationship (see Table 1).

TABLE 1

| Material used in rods 1 | $\alpha \cdot 10^6$ $K^{-1}$ 2 | d, mm 3 | $\beta$, dgrs 4 |
|---|---|---|---|
| 1. Leucosapphire | 9.1 | 8 | 1 |
| 2. Leucosapphire | 9.1 | 8 | 1 |
| 3. Leucosapphire | " | 8 | 2.5 |
| 4. Leucosapphire | " | 10 | 2 |
| 5. Leucosapphire | " | 10 | 1.5 |
| 6. Leucosapphire | " | 14 | 1.5 |
| 7. Leucosapphire | " | 14 | 2.5 |
| 8. Ruby | 9.8 | 10 | 1 |
| 9. Ruby | " | 10 | 2 |
| 10. Ruby | " | 12 | 1.5 |
| 11. Ruby | " | 12 | 2.5 |
| 12. Quartz | 3 | 12 | 1 |
| 13. Quartz | " | 16 | 1.5 |
| 14. Quartz | " | 16 | 2 |
| 15. Quartz | " | 20 | 2.5 |

| L, mm | T, K. | min, mm |
|---|---|---|
| 50 | 1300 | 0.43 |
| 30 | 1000 | 0.28 |
| 60 | 1300 | 0.61 |
| 40 | 1200 | 0.57 |
| 40 | 1100 | 0.48 |
| 60 | 1000 | 0.52 |
| 60 | 1300 | 0.96 |
| 30 | 1000 | 0.31 |
| 50 | 1200 | 0.56 |
| 40 | 1100 | 0.64 |
| 60 | 1300 | 0.92 |
| 30 | 400 | 0.23 |
| 40 | 500 | 0.45 |
| 50 | 500 | 0.60 |

TABLE 1-continued

| 60 | 600 | 0.82 |

If the rods 1 and 2 are mounted with a gap therebetween exceding $\delta_{min}$ there occurs no chipping up of the ends thereof in the case of displacement of the lining 4.

A more advantageous modification is that shown in FIG. 5 wherein one of the abutting ends of the rods 1 and 2 is made spherical, and the other one, i.e. the abutting end 2a of the rod 2, is made spherically concave with the radius of a sphere. In this case the gap $\delta$ is selected by the condition $$\delta > a \cdot \Delta T \cdot (L/2),$$

where the letter symbols are the same as in the condition for the modification shown in FIG. 4.

The above relationship does not include the angle $\beta$ between the rods 1 and 2, since, as shown in FIG. 5, the heat rays from the light-forming rod 1, when the latter is exposed to the melt 5, impinge upon the spherical surface of the light-transmitting rod 2 at one and the same angle, namely, radially to said spherical surface irrespective of the angle $\beta$. This ensures that the heat radiation loss at the joint between the rods 1 and 2 is maintained constant, which provides for the heat radiation being transmitted from the melt being maintained stable, thereby enhancing the measurement accuracy in determining the temperature of the melt 5.

If the rods 1 and 2 are made from a uniaxial crystal having a crystalline anisotropy, in particular, a double refraction, these rods are installed relative each other as shown in FIGS. 6–16 of the accompanying drawings.

Figure 6:
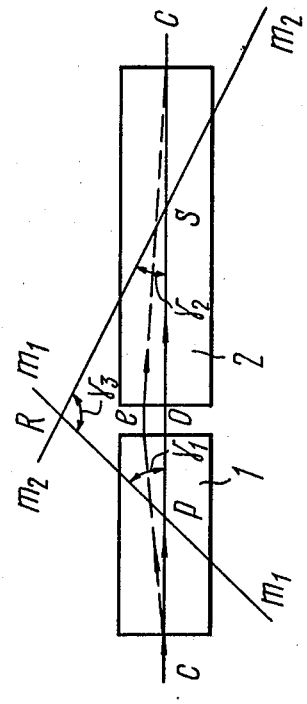
FIG. 6 illustrates the relative position of the light-forming rod and the light-transmitting rod in the case of their being made from a crystal having a double refraction.

In FIG. 6 is illustrated a final position of the rods 1 and 2 when their principal optical planes coincide to form a common plane (coinciding with the plane of the drawing), and their optical axis "$m_1$–$m_1$" and "$m_2$–$m_2$" form together with their common geometrical axis "c–c" a triangle PRS. The segment PS of the axis "c–c" is a base of said triangle, and base angles of this triangle are angles $\gamma_1$ and $\gamma_2$ which are the orientation angles of the crystal in the light-forming rod and the light-transmitting rod respectively. The third angle in said triangle is an angle $\gamma_3$ between the axis "$m_1$–$m_1$" and "$m_2$–$m_2$".

Hereinafter in figures of the accompanying drawings the ordinary ray is denoted by the letter "O", and the extraordinary ray is denoted by the letter "e", with the regular visual rays being shown by a solid line, the regular invisible rays being shown by a dotted line, and the invisible (absorbed) rays being shown by a dash-dot line.

How the influence of a double refraction on the measurement results is eliminated in the proposed light-guide unit is illustrated in FIGS. 7–16 of the accompanying drawings.

Figure 7:
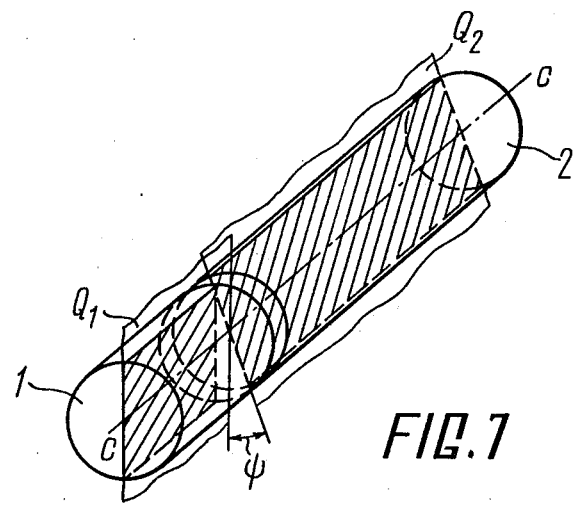

Shown in FIG. 7 is a modification wherein the light-forming rod 1 and the light-transmitting rod 2 are located along one and the same axis "c—c", but the relative orientation of their principal optical planes "$Q_1$" and "$Q_2$" is not specified i.e. is accidental one. As can be seen in this figure, the planes "$Q_1$" and "$Q_2$" are located relative each other at some angle $\psi$ (the planes in question are shown crosshatched).

Figure 8:
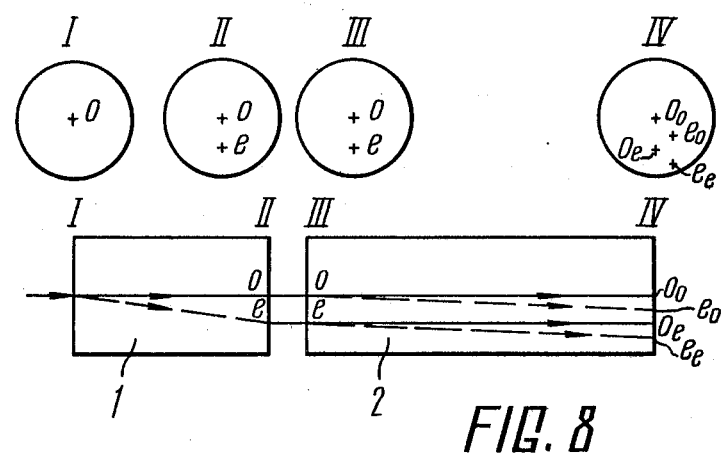

In this case the thermal radiation rays will pass through the light-transmitting rod in a way shown in FIG. 8 wherein are also shown the projection of these rays upon each of the four ends of said unit, viewed from the side of the impinging beam (on the left side in the drawings). The beam impinging normally upon the working end of the light-forming rod 1 is divided into an ordinary ray "O" and an extraordinary "e". The projections of these rays on the end faces II and III defining the gap between the rods 1 and 2 are points "O" and "e". At the entrance to the light-transmitting rod 2 the ordinary ray "O" is split into an ordinary ray "O" and an extraordinary ray "$e_o$", and the extraordinary ray "e" is split into an ordinary ray "$O_e$" and an extraordinary ray "$e_e$". The projections of the rays on the free end of the light-transmitting rod 2 (end IV) represent four points "$O_o$", "$e_o$", "$O_e$" and "$e_e$".

Figure 9:
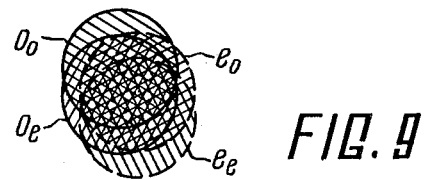

As a result of such refraction of rays caused by non-coincidence of the principal optical planes "$Q_1$" and "$Q_2$" of the rods 1 and 2, the image of the exposed end of the rod 1 (end I) is received by the pyrometer lens (not shown) in the form of four circles of different brightness, corresponding to the rays "$O_o$", "$e_o$", "$O_e$" and "$e_e$", and superposed upon each other (FIG. 9). As can be seen in FIG. 9, the central area of the image which comprises all the superposed portions of all the circles is the brightest one, and the periphery of the image is the least bright one. This difference in brightness affects the measurement accuracy of the pyrometer.

The brightness of said circles, and hence of the image as a whole, depends on the angle between the principal optical plane "$Q_2$" of the light-transmitting rod and the plane of the light wave transverse oscillation of the respective ray. The amplitude of oscillation in the both types of rays is determined from the following relationships, with said angle being denoted by $\psi$:

$$a_o = A \sin \psi$$

$$a_e = A \cos \psi$$

where $a_o$ and $a_e$ are the oscillation amplitudes in the ordinary and extraordinary beams respectively;

A is the oscillation amplitude in the impinging ray.

Figure 10:
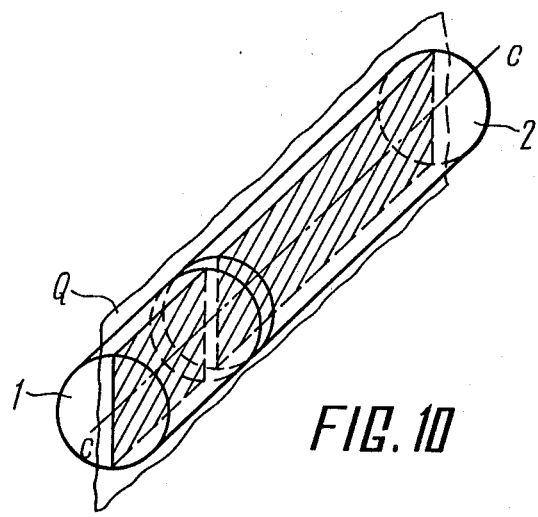
Figure 11:
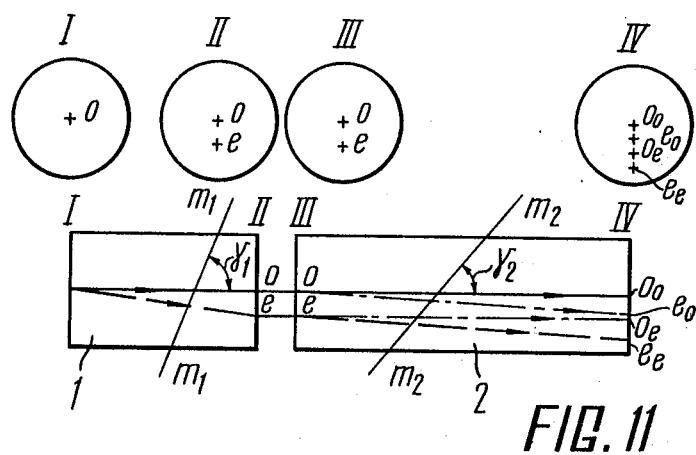

If the principal optical planes of the rods 1 and 2 are caused to coincide to form a common plane "Q", as shown in FIG. 10, without taking into consideration the relative location of the optical axes "$m_1$–$m_1$" and "$m_2$–$m_2$", that is the orientation of the angles $\gamma_1$ and $\gamma_2$, the rays may pass through the light-transmitting rod as shown in FIG. 11.

Figure 12:
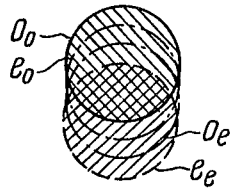

In this case the light-transmitting rod transmits only the two rays, namely the rays "$O_o$" and "$e_e$", for which rays the angle $\psi$ will be equal to 90° and 0° respectively, with the amplitude being equal to the amplitude of an incidence ray. For the rays "$e_o$" and "$O_e$" the angle $\psi$ will be equal to 90° and 0°, with the amplitude being zero, in which case said rays are entirely absorbed by the rod 2 (the invisible rays are shown by the dot-dash line). The image of the exposed end 1 of the light-forming rod 1 represents only two circles which are the light spots of the rays "$O_o$" and "$e_e$" and not four like in the previous case (these light spots are shown in FIG. 12 in solid and dot lines). The light spots of the rays "$e_o$" and "$O_e$" will be invisible.

Figure 13:
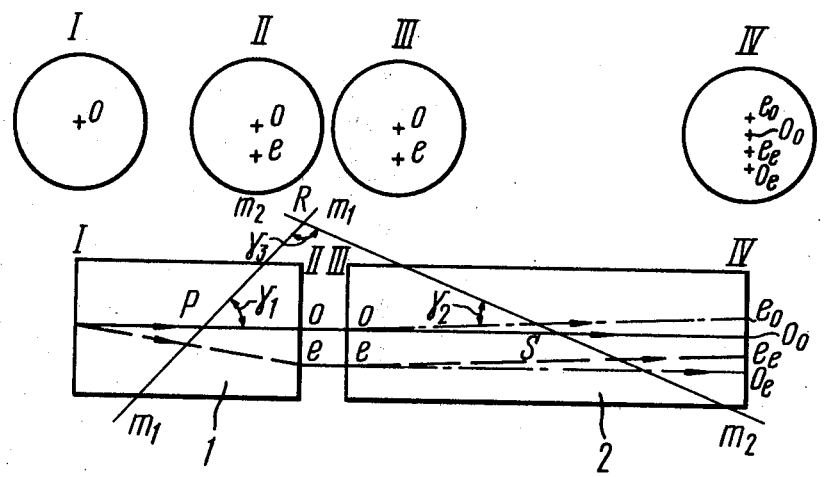
Figure 14:
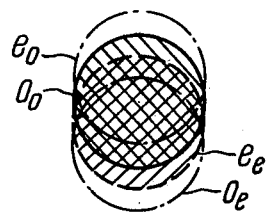

If in addition to the coincidence of the principal optical planes "$Q_1$" and "$Q_2$", the optical axes "$m_1$–$m_1$" and "$m_2$–$m_2$" are located as recommended, but without observing the recommended ratio of the rod 2 length to the length of the rod 1, the rays will pass as shown in FIG. 13, in which case there is formed a triangle PRS having base PS which is a segment on a common geometrical axis of the light-forming rod 1 and the light-transmitting rod 2 and base angles are the angles $\gamma_1$ and $\gamma_2$ determining the orientation of the crystal in the rods 1 and 2 respectively.

In this case for the rays "$e_o$" and "$O_e$" the angle $\psi$ is equal to 90° and 0° respectively and they are, therefore, absorbed by the light-transmitting rod 2. At the same time the rays "$O_o$" and "$e_e$" are transmitted by the rod 2 since the angle $\psi$ is equal to 90° and 0° respectively. If the axes "$m_1$—$m_1$" and "$m_2$—$m_2$" are located as shown in FIG. 13, the distance between the light spots of the rays "$O_o$" and "$e_e$" on the rod 2 end IV is shorter as compared with the case shown in FIG. 11. The image of the exposed end I of the rod 1 represent in this case two overlapping light spots of the rays "$O_o$" and "$e_e$" (FIG. 14), with the area of maximum brightness being larger than that illustrated in FIG. 12.

To cause the light spots of the rays "$O_o$" and "$e_e$" to fully coincide it is necessary that the length of the light-transmitting rod 2 be selected by the recommended relationship $$l_2 = l_1 \frac{n_o - n_{e1}}{n_o - n_{e2}},$$

where $l_1$ and $l_2$ is the length of the light-forming rod 1 and the light-transmitting rod 2, in mm;

$n_o$ is the refractive index of the ordinary ray in the both rods 1,2;

$n_{e1}$ and $n_{e2}$ is the refractive index of the extraordinary ray in the light-forming rod and the light-transmitting rod 2 respectively.

Figure 15:
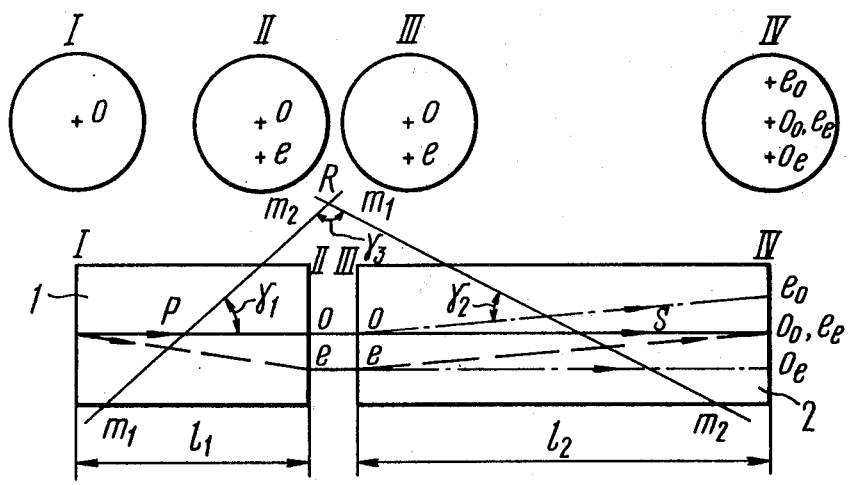
Figure 16:
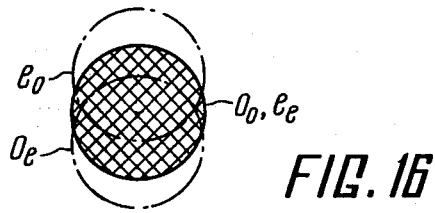

The light paths of said rays are shown in FIG. 15 wherein the rays "$O_o$" and "$e_e$" transmitted by the rod 2 converge at one and the same point on the end face thereof, whereas the rays "$e_o$" and "$O_e$" are absorbed by this rod. In this case the image of the exposed end of the rod 1 represents one light spot with a uniform brightness (FIG. 16), in which case the pyrometer reading fully correspond to the temperature of the melt.

It is to be noted that the initial value for determining the length $l_2$ of the light-transmitting rod 2 is a length $l_1$ of the lightforming rod 1 which is equal, in accordance with the present invention, to the depth of the metallized layer of the lining.

Given in Table 2 are examples of how the length $l_2$ is determined by the above-mentioned relationship. It is also worth noting that some of the crystals, for instance, corundum have $n_e<n_o$, while the other, such as, for instance, quartz, have $n_e>n_o$.

TABLE 2

| Material 1 | $n_o$ 2 | $n_{e1}$ 3 |
|---|---|---|
| 1. Sapphire | 1.7680 | 1.7594 |
| 2. Sapphire | 1.7680 | 1.7594 |
| 3. Ruby | 1.7709 | 1.7629 |
| 4. Ruby | 1.7709 | 1.7629 |
| 5. Leucosapphire | 1.7681 | 1.7599 |
| 6. Leucosapphire | 1.7681 | 1.7599 |
| 7. Quartz | 1.5430 | 1.5520 |
| 8. Quartz | 1.5430 | 1.5520 |

| $n_{e2}$ | $l_1$, in mm | $l_2$, in mm |
|---|---|---|
| 1.7637 | 50 | 100 |
| 1.7672 | 10 | 107.5 |

TABLE 2-continued

| 1.7669 | 50 | 100 |
| 1.7701 | 10 | 100 |
| 1.7640 | 50 | 100 |
| 1.7673 | 10 | 102.5 |
| 1.5475 | 30 | 60 |
| 1.5439 | 15 | 150 |

While particular embodiments of the invention have been shown and described, various modifications thereof will be apparent to those skilled in the art and therefore it is not intended that the invention be limited to the disclosed embodiments or to the details thereof and departures may be made therefrom within the spirit and scope of the invention as defined in the claims.

INDUSTRIAL APPLICABILITY

The present invention is suitable for use in smelting and casting of metal for measuring the temperature of molten ferrous and non-ferrous metals within metallurgical vessels, such as induction furnaces, magnetic hydrodynamic pumps, cupola furnaces, open-hearth furnaces, and converters.

We claim:

1. A light-guide unit for transmitting thermal radiation from a melt of a metallurgical vessel to a pyrometer comprising: a light-forming rod composed of a light-permeable refractory corrosion-resistant material and having a first end exposed to said melt; a light-transmitting rod composed of a light-permeable refractory corrosion-resistant material and arranged coaxially with said light-forming rod, said light-transmitting rod having a first end spaced by a preselected gap from a second end of said light-forming rod and a second end mounted near said pyrometer; a ceramic tube in which said light-forming rod and said light-transmitting rod are coaxially arranged and located in a lining of said metallurgical vessel; a flexible protection sleeve connecting the spaced ends of said light-forming rod and said light-transmitting rod and composed of a material featuring plasticity at an operating temperature of said lining; a first refractory material having a sintering temerature not exceeding the sintering temperature of the lining, a linear expansion coefficient of said first refractory material substantially coinciding at the sintering temperature of the lining with the linear expansion coefficient of said light-forming and light-transmitting rods and a resistance to the effect caused of the products of melting similar to that of the lining, said first refractory material forming at the operating temperature of the lining a viscous mass not fusing together with said light-forming rod, said first refractory material being disposed in a space defined between said light-forming rod and said tube; and a second refractory material having a sintering temperature exceeding both the operating temperature and the sintering temperature of the lining and disposed in a space defined between said light-transmitting rod and said tube; wherein the length of said light-forming rod is equal to the thickness of a metallized layer of said lining and the length of said light-transmitting rod is equal to the thickness of a remaining portion of said lining.

2. A light-guide unit as claimed in claim 1, wherein the light-forming rod and the light transmitting-rod are mounted relative each other so that the principal optical planes of the both rods coincide to form a common plane, whereas the optical axes of these rods together with their common geometrical axis form in said plane a triangle whose base is a corresponding segment on said geometrical axis, and the base angles are angles of orientation of the crystal in said rods, the light-transmitting rod having a length which is determined from the relationship $$l_2 = l_1 \cdot \frac{n_o - n_{e1}}{n_o - n_{e2}},$$

where
- $l_1$ = length of the light-forming rod which is equal to the thickness of the metallized layer of the lining, in mm;
- $l_2$ = length of the light-transmitting rod, in mm;
- $n_o$ = refractive index of the ordinary ray in the light-forming rod and the light-transmitting rod;
- $n_{e1}$ and $n_{e2}$ = refraction index of the extraordinary ray in the light-forming rod and the light-transmitting rod respectively.

3. A light-guide unit as claimed in claim 1, wherein at the place where the light-transmitting rod extends from said tube the second refractory material is a fibrous refractory material, and at the remaining portion of the tube the second refractory material is a powder refractoy material.

4. A light-guide unit as claimed in claim 1, wherein the second refractory material is a fibrous refractory material.

5. A light-guide unit as claimed in claim 1, wherein the protective sleeve is made from a material having a linear expansion coefficient which is lower than that of the light-forming rod and of the light-transmitting rod.

6. A light-guide unit as claimed in claim 1, wherein the protection sleeve has a corrugated portion at the place of joint of the light-forming rod and the light-transmitting rod.

7. A light-guide unit as claimed in claim 1, wherein the light-forming rod and the light-transmitting rod at the place of joint therebetween are provided with flat abutting ends and mounted relative each other in spaced relationship with a size of the gap therebetween determined from the condition $$\delta < d \cdot \tan \beta + \alpha \cdot \Delta T \, (L/2)$$

where
- $\delta$ = gap between said rods, in mm;
- $d$ = diameter of the rods, in mm;
- $\beta$ = maximum angle between the rods in the case of displacement of the lining, in degrees;
- $\Delta T$ = difference between the mean operating temperature of the protection sleeve and the initial temperature thereof, K;
- $L$ = length of the protection sleeve, in mm;
- $\alpha$ = linear expansion coefficient of the rods, $K^{-1}$.

8. A light-guide unit as claimed in claim 1, wherein at the place of joint of the light-forming rod and the light-transmitting rod one of said rods has its abutting end made spherically convex and the other one of said rods has its abutting end made spherically concave with the same radius of a sphere, the rods being mounted relative each other with a gap the size of which is determined from the condition $$\delta > \alpha \cdot \Delta T \cdot (L/2),$$

where
- $\delta$ = gap between said rods, in mm;
- $\alpha$ = linear expansion coefficient of said rods, $K^{-1}$;
- $\Delta T$ = difference between the mean operating temperature of the protection sleeve and the initial temperature thereof, K;
- $L$ = length of the protection sleeve, in mm.

* * * * *